United States Patent [19]

Forsell

[11] Patent Number: 5,600,624
[45] Date of Patent: Feb. 4, 1997

[54] APPARATUS FOR ROTATING AN OPTICAL DISK INCLUDING AN AIR BEARING TURNTABLE

[76] Inventor: Peter Forsell, Goetalandsvaegen 188, 35 Aelvsjoe, S-125, Sweden

[21] Appl. No.: 150,161

[22] PCT Filed: Apr. 1, 1993

[86] PCT No.: PCT/SE93/00279

§ 371 Date: Nov. 30, 1993

§ 102(e) Date: Jan. 4, 1994

[87] PCT Pub. No.: WO93/20556

PCT Pub. Date: Oct. 14, 1993

[30] Foreign Application Priority Data

Apr. 1, 1992 [SE] Sweden ................................ 9201022

[51] Int. Cl.⁶ ............................................. G11B 3/60
[52] U.S. Cl. ............................. 369/266; 369/264
[58] Field of Search ........................ 369/266, 269–271, 369/264

[56] References Cited

U.S. PATENT DOCUMENTS

| | | | |
|---|---|---|---|
| 3,479,038 | 11/1969 | Eisner | 369/269 |
| 3,561,768 | 2/1971 | Castagna | 369/266 |
| 4,087,095 | 5/1978 | Koda | 369/266 |
| 4,256,312 | 3/1981 | Ikeda | 369/269 |
| 4,438,510 | 3/1984 | Matsumoto | 369/271 |
| 4,507,774 | 3/1985 | Marchant | 369/271 |
| 4,783,717 | 11/1988 | Zeeman | 369/266 |

FOREIGN PATENT DOCUMENTS 2278128   2/1976   France.

OTHER PUBLICATIONS

Patent Abstracts of Japan, vol. 8, No. 51 p. 259, abstract of JP, A, 58–200403 (Maikuro Seiki K.K.) Nov. 22, 1983.

Primary Examiner—Robert S. Tupper
Assistant Examiner—Brian E. Miller
Attorney, Agent, or Firm—Townsend and Townsend and Crew LLP

[57] ABSTRACT

An optical disk system comprising a turntable (56) adapted for contact with a CD-disk (6) and having a motor-driven shaft. The system includes an optical unit (10) for projecting a laser beam onto the surface of the CD-disk and detecting laser light reflected back to the unit after it has been modulated with information stored on the disk. The turntable and the motor-driven shaft are supported for rotation by an air journal unit to facilitate the work of the drive motor and to reduce mechanical disturbances.

6 Claims, 3 Drawing Sheets

5,600,624

APPARATUS FOR ROTATING AN OPTICAL DISK INCLUDING AN AIR BEARING TURNTABLE

TECHNICAL FIELD

The present invention relates to an arrangement pertaining to CD-players and comprising a turntable which is intended for contact with a CD-disk and provided with a motor-driven shaft; and an optical unit by means of which a laser beam is projected onto the surface of the CD-disk as the unit scans the disk from its periphery to its centre, said unit detecting laser light which is reflected onto the unit subsequent to having been modulated with information stored on the disk.

In present-day CD systems, an optical disk is rotated around a central shaft of a drive motor. A laser beam is projected onto the disk surface with the aid of a lens, a reflective mirror or beam splitter, and a projection lens. The laser beam is modulated with the information stored on the disk and the modulated light is detected by a photodetector. The detector output signals are delivered to a processor for producing information signals and tracing or tracking signals. The laser beam source, the lens, the mirror, the projection lens and the detector together form an optical unit which is caused to move from the periphery of the disk in towards the disk centre with the purpose of reading the information stored on the disk.

More specifically, the disk is read at a constant speed, meaning that the disk drive motor must be rotated progressively to a higher speed as the optical unit moves in towards the centre of the disk. In turn, this assumes that the drive system has no appreciable mass, since otherwise the motor would not be capable of managing the requisite, continuous rapid changes in speed in an adequate fashion.

DISCLOSURE OF THE INVENTION

An object of the invention is to facilitate the work of the drive motor in the case of a drive arrangement of the kind defined in the introduction, and also to reduce mechanical disturbances and interference.

According to the present invention, this object is achieved by supporting the turntable and the motor-driven shaft on an air journal means.

According to one highly advantageous embodiment, at present preferred, the air journal means and the turntable and motor-driven shaft are combined to form an air journal unit, which enables, in particular, the optical unit and the air journal unit to be constructed so as to be separable in relation to one another.

In this regard, the optical unit may be incorporated in a lid which can be closed over the air journal unit. An attractive solution is achieved when the air journal unit and the drive motor are commonly fitted in a lid that can be closed over the optical unit.

Alternatively, the air journal unit may form part of a lid which can be closed over the optical unit and preferably also over the motor. A surprisingly simple embodiment of the air journal means is obtained when the turntable is mounted for rotation on a flat element or sunk into the surface of a flat element which has an air chamber connected to the undersurface of the turntable.

The invention can be applied with all conceivable positions of the drive motor. For instance, in addition to the aforedescribed, the drive motor may be incorporated in the air journal unit and may also drive the turntable by means of a belt drive.

It has been found in practice that a noticeable sound improvement can be obtained by journalling the turntable and its shaft on an air journal. This is because the invention provides smoother movement of the turntable and reduces the occurrence of mechanical disturbances, which in turn increases precision in focusing the laser beam.

BRIEF DESCRIPTION OF THE DRAWINGS

Exemplifying embodiments of the invention will now be described in more detail with reference to the accompanying drawings, in which.

DESCRIPTION OF EXEMPLIFYING EMBODIMENTS

Figure 1:
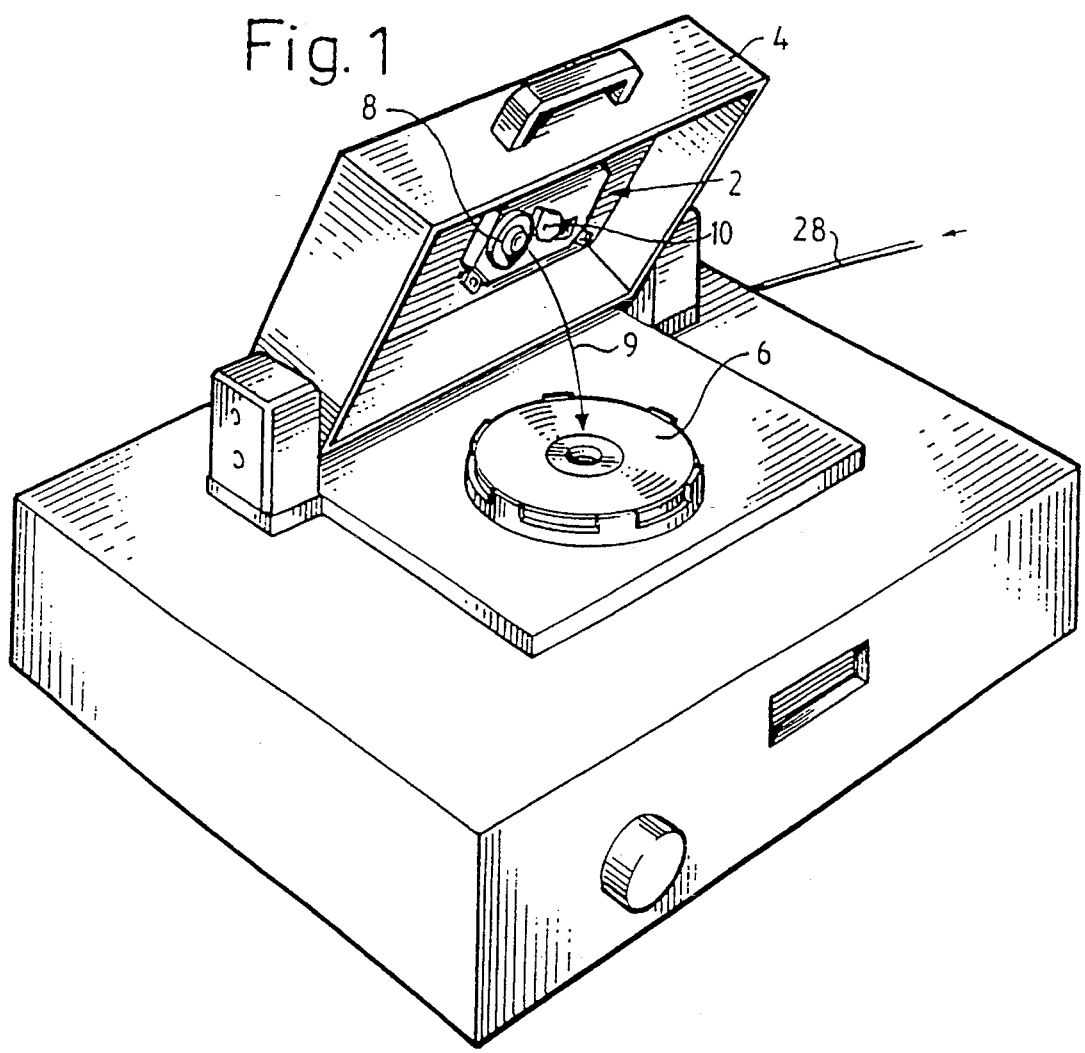
FIG. 1 illustrates in perspective a CD-player fitted with a first embodiment of the inventive arrangement, which includes a disk journalling unit.

Identical or similar elements of the various embodiments illustrated in the drawings have been identified with the same reference signs.

FIG. 1 illustrates a CD-player which includes a combined drive and optical unit, generally reference 2, which may of any known kind, for instance . . . . The unit 2 is mounted on the undersurface of a hinged lid, which can be lowered from the illustrated raised position so as to bring the unit 2 into coaction with a CD-disk 6. Briefly, the unit 2 includes a drive motor 8 which when the lid 4 is lowered and the drive motor moves in the path shown by the arrow 9, the motor is brought into engagement with a disk turntable, described in more detail herebelow, for co-rotation of the turntable and disk. The unit 2 also includes an optical unit 10.

The optical unit 10 functions to project a laser beam in a known manner onto the surface of the CD-disk 6 as the unit 10 scans across the disk from its periphery to its centre. The unit 10 is also constructed to detect laser light that is reflected onto the unit after having been modulated with information stored on the disk.

Figure 2:
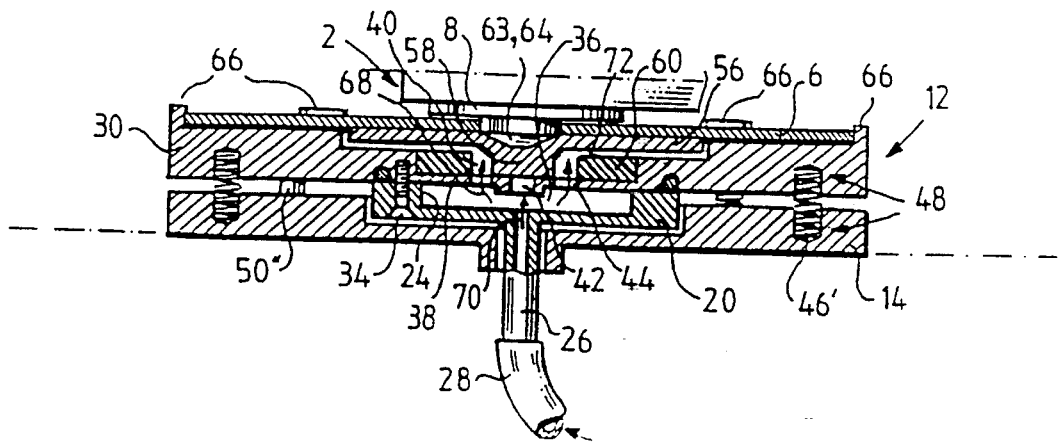
FIG. 2 is an axial section view of the disk journal unit shown in FIG. 1.
Figure 3:
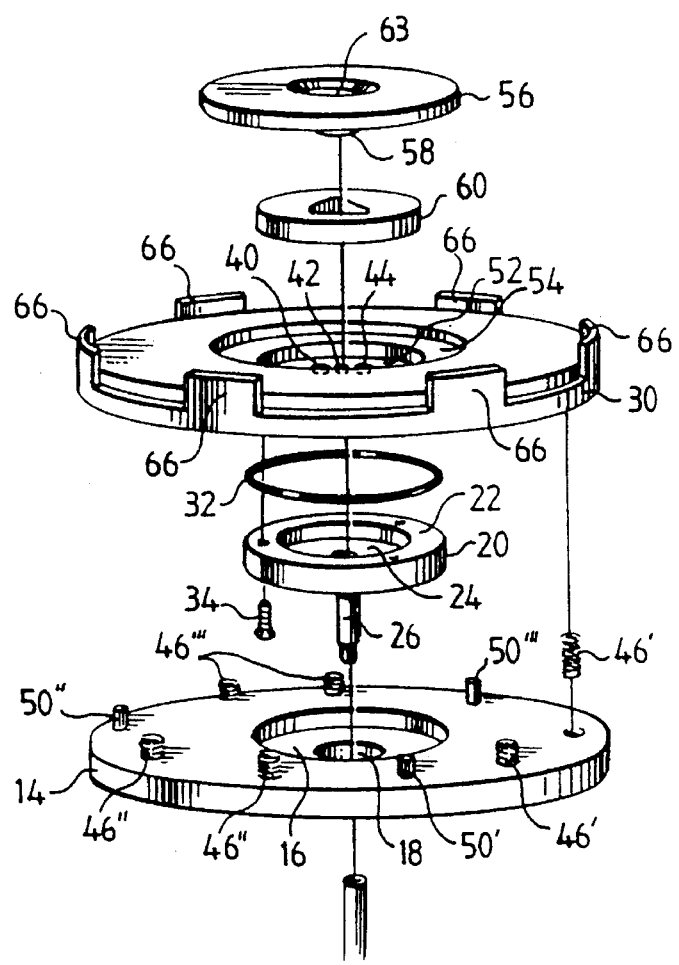
FIG. 3 is an exploded view of the disk journal unit shown in FIG. 1.

A CD-disk journalling unit, generally referenced 12, is shown in axial section in FIG. 2, the relationship between the essential components of the journalling unit also being evident from the exploded view of FIG. 3. The journal unit 12 comprises a bottom carrier plate 14 which has a central recess 16 and a central through-penetrating hole 18. Mounted in the recess 16 is an air chamber disk 20 which includes a recess 24 which is surrounded by a ring-shaped edge part 22. The outlet orifice of a pipe connector 26 formed integrally with the air chamber disk 20 is located in the centre of the recess 24. The pipe connector 26 extends down through the hole 18 and the other end of said pipe connector is connected to an air pipe or hose 28.

The ring-shaped edge part 22 of the air chamber disk 20 seals against the underside of a mounting plate 30, through the medium of an O-ring 32. More specifically, the air chamber disk 20 and the mounting plate 30 are mutually joined by means of screw fasteners, as shown at 34.

The mounting plate 30 and the air chamber disk 20 joined thereto enclose therebetween an air chamber 36 which communicates with the air pipe 26. The chamber 36 has an upper wall 38 which is formed by a thin, circular bottom wall of the mounting plate 30 and which includes three through-penetrating holes 40, 42 and 44. The carrier plate 14 supports the mounting plate 30 through the medium of three peripherally arranged and uniformly spaced coil spring pairs 46', 46" and 46'". One end of the respective springs of said spring pairs is seated in an associated recess in the plate 14, while the other end of respective springs is seated in an opposing, corresponding recess in the plate 30. This is indicated by the double arrow 48 in FIG. 2 with respect to one spring of the spring pair 46'. Mounted peripherally on the upper side of the plate 14 between said spring pairs are three guide pins 50', 50" and 50'", each of which is slidably received in a respective corresponding, opposing guide hole in the underside of the plate 30, to provide displaceable, but non-rotatable, mutual engagement between the plates 14 and 30.

As before mentioned, the upper wall 38 of the air chamber 36 is formed by a thin circular bottom wall on the plate 30. This bottom wall forms part of a central circular recess 52, which in turn merges with a ring-shaped, upper abutment-forming recess 54 in the surface of the plate 30. The recess 54 forms a seat for a turntable 56 whose periphery conforms essentially to the periphery of the recess-defining wall, and has a journal pin 58 which extends down into the recess 52 and terminates close to the bottom of said recess. In this case, the recess 52 includes a bushing 60 which receives the journal pin 58. The bushing 60 functions to guide lateral movement of the journal pin 58, to facilitate centering of the turntable 56, as described in more detail below. In operation, there is no contact between the pin 58 and the bushing 60 as the turntable rotates, as described in more detail below.

In a known manner, the upper surface of the turntable 56 includes a central, conical recess 63 which is intended to engage a correspondingly configured end 64 of a motor drive shaft, as shown in FIG. 2. This engagement is instrumental in achieving precise adjustment of the optical unit 10 in relation to the turntable 56, and therewith relative to a CD-disk 6 placed on the turntable with the motor shaft extending through the centre hole in said disk, and is also instrumental in enabling the turntable 56 to be rotated by the motor shaft together with the CD-disk 6 in the manner intended. Disposed peripherally around the plate 30 are a number of upstanding guide tongues 66 which when the disk is placed initially on the turntable 56 guide the disk initially to a central position relative to the drive shaft sufficient for the conical end 64 of the drive shaft to guide the disk to its exact playing position.

When the arrangement illustrated in FIG. 2 is in operation, air is supplied to the air chamber 36, through the air pipe 28 and the pipe 26. This air generates an overpressure in the chamber 36 which lifts the turntable 56 and the CD-disk 6 carried thereon through the agency of the air holes 40, 42 and 44, as shown by arrows 68, 70 and 72. Although not shown, the unit 2, and therewith also the motor 8, is suspended on spring means and lifting of the turntable 56 and the CD-disk 6 occurs against the action of the spring suspension means. In turn, the shaft end 65 of the motor 8 exerts engagement pressure on the turntable 56 against the action of the coil spring pairs 46', 46" and 46'". Air seeps out between the turntable 56 and the CD-disk 6 on the one hand and the plate 30 on the other hand, so as to form an air journal for rotation of the turntable, the journal pin 58 and the CD-disk 6. Consequently, these parts rotate in the absence of friction.

Figure 4:
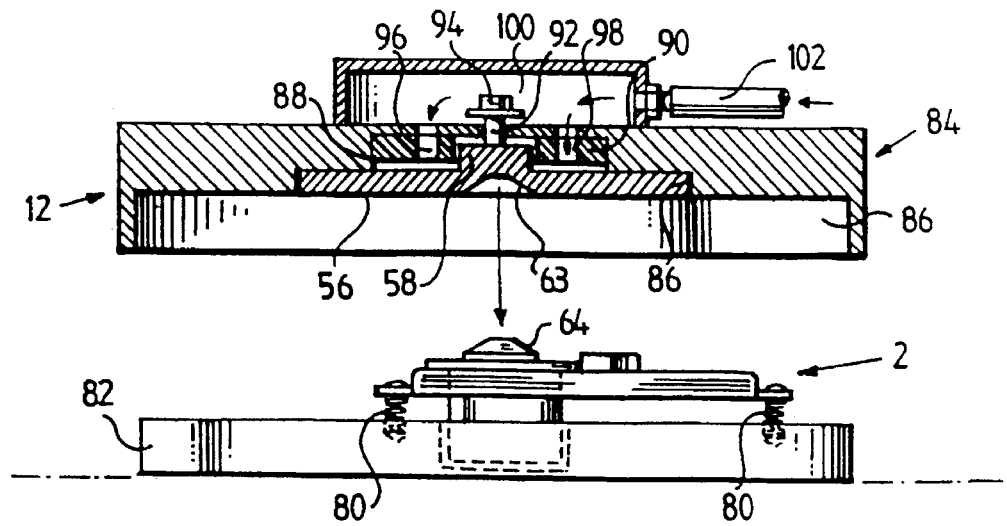
FIGS. 4–6 illustrate respectively second, third and fourth exemplifying embodiments of the inventive arrangement provided with corresponding disk journal units.

FIG. 4 illustrates an embodiment in which, for instance, the same drive and optical unit 2 is intended to be active in a conventional, inverse position in relation to the embodiment illustrated in FIGS. 1–3. As indicated at 80, a circular plate 82 is resiliently mounted on the chassis (not shown) of the CD-player.

The turntable 56 is mounted in a round, separate lid unit, generally referenced 84, forming a lid which can be placed on the plate 82. The lid unit 84 has a lid edge 86 which is intended preferably to embrace the periphery of the plate 82 in a light-impervious fashion. More specifically, the turntable 56 and its journal pin 58 are sunk into a central, shouldered recess in the bottom of the lid 84. This recess includes a shallow, ring-shaped, turntable accommodating cavity 86 and a circular, central recess 88 adjacent thereto in which the journal pin 58 is guided for rotation by a surrounding bushing 90, for instance of the same kind as the bushing 60 of the earlier described embodiment. In the illustrated case, there is a clearance between the turntable 56 and the bushing 90, and also between the end of the journal pin 58 and the bottom of the recess 88.

The bottom of the recess 88 includes a through-penetrating hole through which a turntable holding screw 92 extends with clearance. The screw 92 has on the other side of the lid 84 a head 94 which is spaced from the turntable 56 so as to provide limited movement of the screw in its axial direction. Extending through the bottom of the recess 88 and through the bushing 90 are air holes 96, 98 which together with the hole that accommodates the holder screw 92 function to place the rear side of the turntable 56 in communication with an air chamber 100 defined by a box-like structure on the top of the lid 84. The air chamber 100 includes an air pipe 102.

When using the CD-player shown in FIG. 4, the CD-disk (not shown in this Figure) is placed on the unit 2 with the disk hole located around the motor shaft. The lid unit 84 is then placed over the plate 82, wherewith the conical end 64 of the motor shaft will be brought into driving engagement with the correspondingly shaped recess 63 in the centre of the turntable 56, through the guiding action of the lid edge 86 around the periphery of the plate, in a manner similar to that described with reference to the earlier embodiment.

Air is supplied to the chamber 100 so as to generate an overpressure in the chamber, this overpressure propagating to the rear side of the turntable through the air holes 96, 98 and the holder screw accommodating hole. A stream of air seeps from the rear side of the turntable out between said turntable and the opposing inner surface of the lid 84 so as to form an air journal for rotation of the turntable, in the same manner as with the earlier described embodiment.

Figure 5:
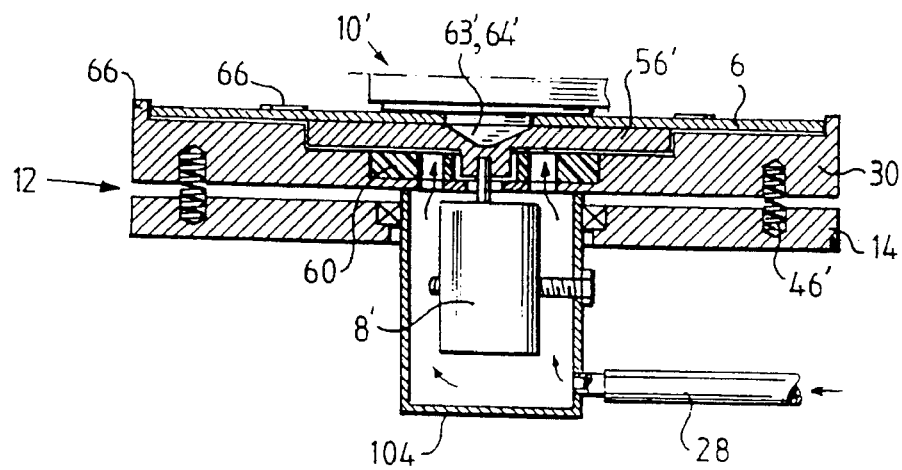
Figure 6:
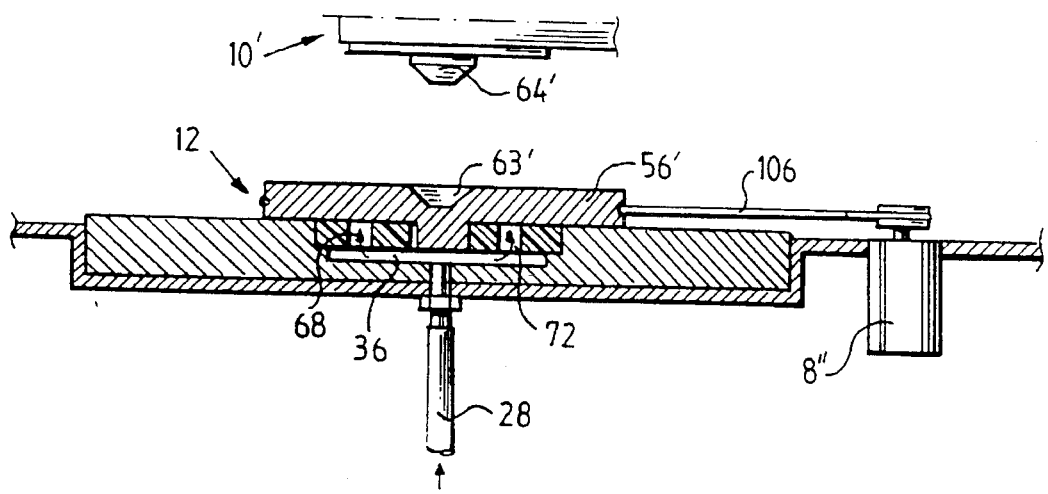

The two exemplifying embodiments illustrated in FIGS. 5 and 6 differ from the earlier embodiments in that the drive motor and the optical unit are separate from one another. In this case, the optical unit is referenced 10' and is provided with a conical guide pin 64' which is intended to engage the conical central recess 63' of a turntable 56' configured in the same manner as earlier, so as to obtain precise setting of the optical unit in relation to the turntable and therewith in relation to a CD-disk 6 placed on the turntable.

In principle, the embodiment of the air journal means illustrated in FIG. 5 is the same as the embodiment illustrated in FIGS. 1–3, as will be evident by the use of the same reference signs as those used in the earlier case. It is therefore not necessary to describe this embodiment in detail. However, the difference in this case lies in the fact that the drive motor, referenced 8', is in constant driving engagement with the turntable 56' from beneath. This necessitates encapsulating the motor 8' in an airtight housing 104, in the manner illustrated, which forms part of the air conduit to the air journal means of the turntable 56'.

In the case of the FIG. 6 embodiment, the turntable 56' is driven by the motor, here referenced 8", via a belt drive 106. It is therefore easier in this case to supply air for creating a turntable air journal than in the earlier embodiment, although in principle the air is supplied in the same manner as in the first embodiment, i.e. via an air hose 28, air chamber 36 and air holes 68, 74.

I claim:

1. An optical disk system for reading a CD-disk comprising:

an optical unit for projecting a laser beam onto a surface of the CD-disk, the optical unit being adapted to detect laser light reflected back onto the optical unit after having been modulated with information stored on the CD-disk;

an air journal unit having a support member, a turntable adapted for contact with the CD-disk, and a planar element disposed between the support member and the turntable, the planar element having first and second opposing sides and defining an air chamber between the second side and the support member, the turntable having first and second opposing sides, the second side being rotatably supported on a surface of the first side of the planar element, said surface having a recess forming a space between the first side of the planar element and the second side of the turntable, the air chamber having an inlet opening for receiving pressurized air and a plurality of outlet openings fluidly coupling the air chamber with said space between the first side of the planar element and the first side of the turntable, the air journal unit being separable from the optical unit to allow introduction of the CD-disk onto the turntable;

an air chamber disc disposed within the air chamber for supporting, the planar element above the support member; and a motor-driven shaft for rotating the turntable and the CD-disk therewith, the turntable having a centrally located journal pin extending from the first side of the turntable, one of the plurality of outlet openings in the air chamber receiving the journal pin to form an air journal means for the journal pin and the motor-driven shaft, the turntable being separable from said planar element by air introduced into said space through said outlet openings to create an air bearing between the turntable and the planar element, thereby minimizing friction as the turntable rotates.

2. An apparatus according to claim 1 wherein the optical unit is incorporated in a lid that can be placed over the air journal unit.

3. An apparatus according to claim 1 wherein a portion of the motor-driven shaft is enclosed in said air chamber to form part of the air journal unit.

4. An apparatus according to claim 1 wherein the optical unit and the motor-driven shaft are both incorporated in a lid that can be lowered over the air journal unit.

5. An apparatus according to claim 1 wherein the air journal unit forms part of a lid that can be placed over the optical unit.

6. An apparatus according to claim 5, wherein the lid can also be placed over the motor-driven shaft.

* * * * *